United States Patent [19]

Goebel et al.

[11] 4,284,691

[45] Aug. 18, 1981

[54] ELECTROCHEMICAL CELL

[75] Inventors: Franz Goebel, Sudbury; William T. McHugh, Westwood, both of Mass.

[73] Assignee: GTE Products Corporation, Stamford, Conn.

[21] Appl. No.: 159,271

[22] Filed: Jun. 13, 1980

[51] Int. Cl.³ ............................................. H01M 2/26
[52] U.S. Cl. ................................... 429/105; 429/128
[58] Field of Search ............... 429/101, 104, 153, 161, 429/196, 105, 128

[56] References Cited

U.S. PATENT DOCUMENTS

| 701,253 | 5/1902 | Bennett | 429/153 |
|---|---|---|---|
| 2,379,374 | 6/1945 | Payne | 429/128 |
| 3,059,041 | 10/1962 | Vogt | 429/128 |
| 4,148,974 | 4/1979 | Eppley | 429/101 |

Primary Examiner—Donald L. Walton
Attorney, Agent, or Firm—Peter Xiarhos

[57] ABSTRACT

A high-rate, low-temperature, primary electrochemical cell. The cell in accordance with the invention includes an elongated cylindrical metal housing within which a vertical array of battery stack components is disposed and exposed to a cathodelectrolyte solution. Each of the battery stack components has an opening therein through which an elongated metal rod located centrally within the housing passes and serves as an electrical terminal for the cell.

The components of the battery stack include a plurality of thin, flat, circular, lithium anode discs secured to the metal rod, and a plurality of carbon current collector cathode/insulator structures arranged in the array in alternation with the lithium anode discs. Each of the carbon current collector cathode/insulator structures includes a generally circular, thin, metal current collector spaced from the metal rod by way of the opening therein and having a size and shape so as to generally conform to the interior configuration of the housing and make direct physical contact with an interior wall of the housing. First and second circular, flat, thin, porous carbon layers are disposed on opposite sides of the metal current collector and spaced from the metal rod by way of the openings therein. First and second circular, flat, porous fiberglass insulators integrated with the first and second porous carbon layers, respectively, are in direct physical contact with adjacent ones of the lithium anode discs and separate the porous carbon layers from the adjacent lithium anode discs.

26 Claims, 7 Drawing Figures

ELECTROCHEMICAL CELL

CROSS-REFERENCE TO RELATED APPLICATIONS

In co-pending patent application Ser. No. 159,266, filed concurrently herewith in the names of John E. Barnes, Franz Goebel and William T. McHugh, and entitled "INTEGRATED CARBON/INSULATOR STRUCTURE AND METHOD FOR FABRICATING SAME", there is disclosed and claimed an integrated carbon/insulator structure as may be used in an electrochemical cell as disclosed and claimed in the present application.

In co-pending patent application Ser. No. 159,267, filed concurrently herewith in the names of Franz Goebel and William T. McHugh, and entitled "METAL SUBSTRATE FOR AN ELECTROCHEMICAL CELL", there is disclosed and claimed a metal substrate which may be used in the assembly of a carbon current collector electrode/separator structure for the electrochemical cell as disclosed and claimed in the present application.

BACKGROUND OF THE INVENTION

The present invention relates to an electrochemical cell and, more particularly, to a primary electrochemical cell for high-rate, low-temperature applications.

There are many situations in which it is desirable to utilize a primary electrochemical cell, such as a cylindrical electrochemical cell, in a high-rate, low-temperature application, for example, at a rate greater than 1 mA/cm$^2$ and a temperature to $-40°$ C. The most common design of a high-rate cylindrical primary electrochemical cell includes a combination of an anode, a cathode electrode structure, and a separator. These elements are rolled up together, with the separator being sandwiched between the anode and the cathode electrode structure. A typical implementation of a spiral-wound, or "jelly-roll", structure as decribed above includes an anode of an oxidizable alkali metal such as lithium (within a supporting metal grid), a cathode electrode structure comprising a metal current collector (e.g., a nickel grid or screen) physically supporting an aggregation of porous carbon globules or conglomerates, and a separator of an electrically-nonconducting material such as fiberglass. These cell components normally are in a form prior to assembly of elongated rectangular strips. The arrangement of cell components as described above is utilized within the cell with a suitable electrolytic solution. A common electrolytic solution for a primary electrochemical cell is a cathodelectrolyte solution including a reducible soluble cathode such as thionyl chloride and an electrolyte solute such as lithium tetrachloroaluminate dissolved in the thionyl chloride. During the discharge of the cell having the abovedescribed components and specific materials, a progressive depletion of the lithium anode takes place as electrochemical reaction occurs within the cell and discharge products are formed. This action is normally accompanied by the generation of a small and tolerable amount of heat in the cell, more particularly, in the region of the cathode structure.

While a cylindrical spiral-wound electrochemical cell as described hereinabove operates in a generally satisfactory manner, the cell is subject to substantial IR (internal resistance) losses due to the lengths of the electrodes. As a result, there is non-uniform and incomplete utilization of the active material of the cell and, thus, a limitation on the rate of discharge of the cell and the temperature at which the cell will operate in its intended and desired fashion. In addition, the spiral-wound nature of the components of the cell tends to lead to the retention of heat developed in the cell during discharge of the cell, limiting the degree to which the heat can be effectively dissipated away from the interior of the cell to the outside, specifically, to the metal can or housing of the cell. An excessive buildup of heat within the cell can, in severe cases, lead to extensive physical damage to the cell.

BRIEF SUMMARY OF THE INVENTION

In accordance with the present invention, an electrochemical cell is provided which avoids the shortcomings and disadvantages of prior art electrochemical cells as described hereinabove.

The electrochemical cell in accordance with the present invention includes a plurality of batterystack components exposed to an electrolytic solution within an elongated metal housing of the cell. The battery components are arranged in a stacked array encircling an elongated metal terminal provided within and along the direction of the housing. The array of battery stack components comprises a plurality of metal electrode (e.g., anode) structures and a plurality of carbon electrode/insulator structures arranged in the array in alternation with the metal electrode structures.

The plurality of metal electrode structures as employed within the cell are arranged in direct physical contact with the elongated metal terminal and spaced from an interior wall of the housing. Each of the plurality of carbon electrode/insulator structures comprises a metal substrate, first and second porous carbon layers, and first and second porous insulators. The metal substrate is spaced from the elongated metal terminal and in direct physical contact with the interior wall of the housing. The first and second porous carbon layers are disposed on opposite sides of, and in direct physical contact with, the metal substrate and spaced from the elongated metal terminal. Each of the porous carbon layers has a network of electrolyte-conducting channels therethrough for the receipt of, and to be permeated by, the electrolytic solution within the housing. The first and second porous insulators are in direct physical contact with the first and second carbon layers, respectively, and in direct physical contact with adjacent ones of the metal electrode structures and separating the carbon layers from the adjacent metal electrode structures.

BRIEF DESCRIPTION OF THE DRAWING

Various objects, features and advantages of an electrochemical cell in accordance with the present invention will be apparent from a detailed discussion taken in conjunction with the accompanying drawing in which.

DETAILED DESCRIPTION OF THE INVENTION

Figure 1:
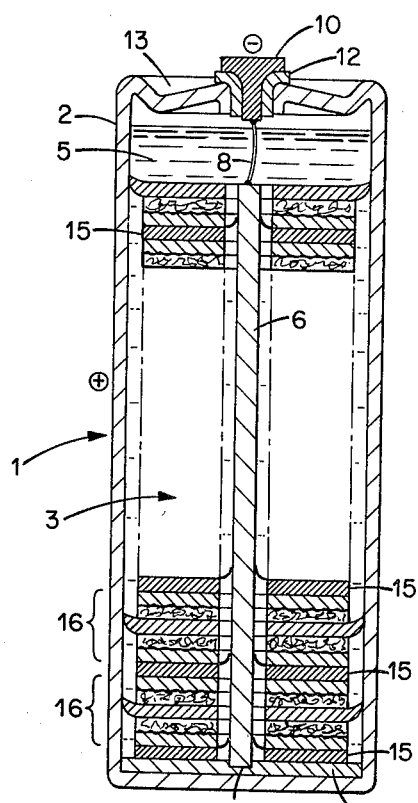
FIG. 1 is an elevational view in cross section of a primary electrochemical cell in accordance with the present invention.

Referring now to FIG. 1, there is shown a primary electrochemical cell 1 in accordance with the present invention. The electrochemical cell 1 as shown in FIG. 1 generally includes a cylindrical metal case or housing 2, for example, of stainless steel, within which a battery stack 3 is disposed and insulated from the metal housing 2 by means of a suitable insulator 4 at a bottom end of the housing. The housing 2 of the cell 1 further includes an electrolytic solution 5 in contact with the battery stack 3. This solution may include a reducible soluble cathode such as thionyl chloride and an electrolyte solute such as lithium tetrachloroaluminate dissolved in the thionyl chloride.

The battery stack 3 as employed within the cell 1 comprises a large number of thin, generally circular, annular-shaped components which are directly superimposed on each other in a vertical stacked array relative to the housing 2 and relative to an elongated cylindrical solid metal rod 6 which extends completely through the battery stack 3 and in encircled by the aforesaid components. The rod 6, which is typically of a metal such as nickel and having a diameter of 0.042 inch, is restrained at its bottom end within a detent 7 in the insulator 4 and connected at its top end by a thin metal strip 8 to a metal terminal 10 of the cell 1. The metal strip 8, which may be of nickel, is typically connected to the rod 6 and to the terminal 10 by the spot welds and is connected to the terminal 10 by way of a standard insulative glass or ceramic-to-metal seal 12 provided within an hermetically sealed cap 13 of the cell 1. As will be more readily apparent hereinafter, the rod 6, the metal strip 8 and the terminal 10 collectively represent one of the electrical terminals for the cell 1.

The various stacked components of the battery stack 3 as mentioned hereinabove generally include a plurality of anode structures 15 and a plurality of carbon current collector electrode/separator assemblies 16 arranged in the array in alternation with the anode structures 15. Each of the anode structures 15 has a particular form as shown in FIGS. 2 and 3, and each of the carbon current collector electrode/separator assemblies 16 has a particular form as shown in FIGS. 4 and 5.

Figure 2:
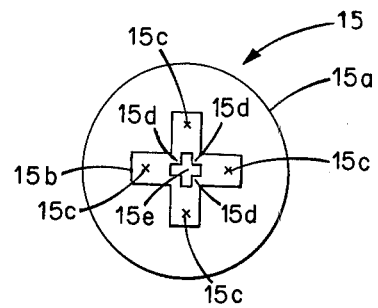
FIGS. 2 and 3 are top and side views, respectively, of an anode structure utilized by the electrochemical cell of FIG. 1.
Figure 3:
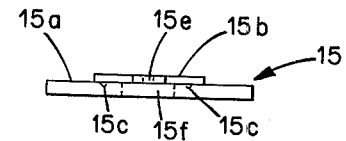

As indicated in FIGS. 2 and 3, each of the anode structures 15 comprises a thin, flat, generally circular, annular-shaped disc 15a, and a cross-shaped contact member 15b secured to the disc 15a. A suitable material for the disc 15a for use within the cell 1 is an oxidizable alkali metal, such as lithium, and a suitable thickness is 0.005–0.006 inch. The cross-shaped contact member 15b, which may be of nickel of a thickness of 0.003–0.005 inch, is secured to the lithium anode disc 15a by means of several small tines or barbs 15c which are stamped into the arms thereof and which "bite" into the soft lithium metal for physical and electrical contact therewith. The contact member 15b further has a plurality of resilient portions 15d which collectively define a cross-shaped opening 15e in the contact member 15b. This opening is aligned with a larger central opening 15f (FIG. 3) in the lithium anode disc 15a. The opening 15e in the contact member 15b has a size as defined by the portions 15d so that the anode structure 15 can be assembled onto the rod 6 by simply forcing the anode structure 15 over the top end of the rod 6 and sliding the anode structure 15 down the rod 6 to its proper position in the stack. When in its proper position in the stack, and as indicated in FIG. 1, the resilient portions 15d of the contact member 15b are deflected upwardly slightly and in direct physical and electrical contact with the rod 6 and, due to the sharp edges of the portions 15d, bite into the rod 6 so as to secure the anode structure 15 in position. As indicated in FIG. 1, the diameter of each anode structure 15 is selected to be smaller than the internal diameter of the housing 2 of the cell 1 so as to establish a space, the purpose of which will be explained hereinafter, between the anode structure 15 and the interior wall of the housing 2. A suitable diameter for the anode structure 15 is 0.850 inch, corresponding to a C-size cell. A typical internal diameter for the housing 2 is 0.960 inch. A significant feature of the anode structure 15 as described hereinabove is that the lithium anode disc 15c is effectively self supporting and requires no additional support such as a metal grid or substrate as commonly employed by anode structures of prior art cylindrical electrochemical cells.

Figure 4:
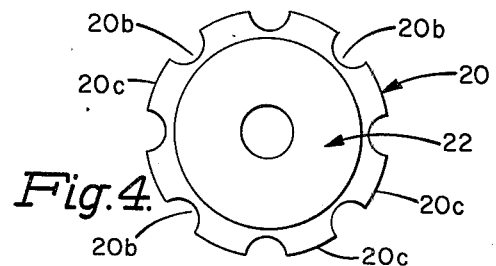
FIGS. 4 and 5 are top and cross-sectional views, respectively, of a carbon current collector electrode/separator assembly utilized by the electrochemical cell of FIG. 1.
Figure 5:
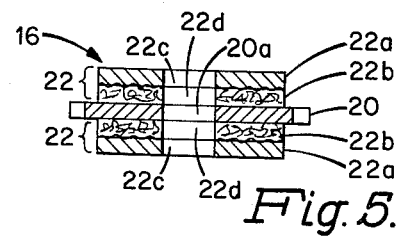
Figure 6:
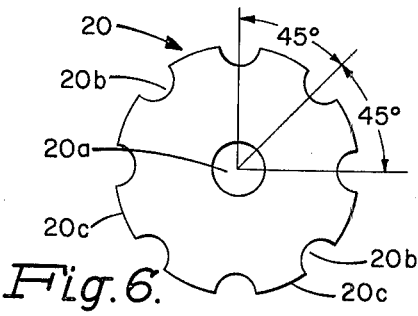
FIG. 6 is a top view of a metal current collector substrate employed in the carbon current collector electrode/separator assembly shown in FIGS. 4 and 5.

Each of the aforementioned carbon current collector electrode/separator assemblies 16 as shown in FIGS. 4 and 5 generally includes a thin, circular, notched metal current collector substrate 20, and a pair of integrated carbon/insulator structures 22 on opposite sides of the current collector substrate 20. The integrated carbon/insulator structures 22 as shown in FIGS. 1 and 5, although forming part of the electrode/separator assembly within the cell 1, both physically and actively, are not secured to the current collector substrate 20 but rather are not only in direct physical contact with the substrate 20 when assembled into the cell 1. The current collector substrate 20 as employed by the invention and shown in FIG. 6 takes the form of a generally thin, circular, flat disc of a metal such as nickel having a circular central opening 20a and a plurality of openings 20b in the form of curved notches spaced around its periphery at 45° intervals and defining small arcuate peripheral portions 20c intermediate to the notches. A suitable radius for each of the notches 20b is 0.047 (3/64) inch. The opening 20a in the substrate 20 is of a diameter greater than the diameter of the rod 6 so as to establish a spacing, and to be electrically isolated from, the rod 6 when the substrate 20 and the associated carbon/insulator structures 22 are assembled together into the cell 1. The purpose of the notches 20b and the arcuate peripheral portions 20c will be explained hereinafter.

Each of the carbon/insulator structures 22 used with the abovedescribed current collector substrate 20 comprises, as shown in FIG. 5, an arrangement of a thin porous insulator sheet or disc 22a physically and permanently integrated with a porous carbon layer or disc 22b. The porous insulator disc 22a is of an electrically-nonconducting material such as fiberglass (woven or unwoven) and serves as a separator for electrically isolating the associated porous carbon disc 22b from an immediately adjacent one of the lithium anode structures 15. The porous carbon disc or layer 22b comprises an aggregation of porous globules or conglomerates containing carbon black and a binder such as "Teflon" and having a network of electrolyte-conducting channels formed throughout its entire mass, the purpose of which will be explained more fully hereinafter. For purposes of assembly within the cell 1, the porous insulator disc 22a and the porous carbon layer 22b have respective circular central openings 22c and 22d of the same size as, and aligned with, the opening 20a in the current collector substrate 20 for providing a space between these elements and the rod 6 when assembled within the cell 1.

Although the carbon/insulator structures 22 as described hereinabove can be fabricated in different ways, a preferred fabrication method is described in detail in the aforementioned co-pending application Ser. No. 159,266 to which reference may be made for specific details. Suitable thicknesses for the porous insulator disc 22a and the porous carbon layer 22b for use in the present invention are 0.005 and 0.007 inch, respectively. A suitable thickness for the current collector substrate 20 is 0.003 inch.

The current collector substrate 20 and the associated pair of carbon/insulator structures 22 are assembled relative to the rod 6 by first sliding the lower one of the carbon/insulator structures 22, which has a diameter (e.g., 0.060 inch) smaller than the internal diameter of the cell 1, over the rod 6 and then placing the current collector substrate 20 on top of the lower carbon/insulator structure 22 (with the carbon layer 22b facing the current collector substrate 20). In this latter operation, and to insure that the current collector substrate 20 is fixed securely in position when assembled into the housing 2 of the cell 1, the current collector substrate 20 is made to have a diameter prior to insertion into the housing 2 which is slightly greater than the internal diameter of the housing of the cell 1, for example, a diameter of 0.972 inch compared with an internal diameter of 0.960 inch for the housing 2. When the current collector substrate 20 is inserted into the cell, specifically, by pushing the substrate 20 longitudinally into the housing 2, the arcuate portions 20c are caused to turn, or be deflected, upwardly slightly by virtue of physical contact with the interior wall of the housing 2. At the same time, the arcuate portions 20d are caused to move slightly toward each other as the substrate 20 conforms to the internal diameter and configuration of the housing 2. The notches 20b at the periphery of the substrate 20 thereby prevent the substrate 20 from being wrinkled or otherwise damaged by virtue of excessive deformation of the substrate. When the substrate 20 has been assembled to its proper and desired position within the stack, the upturned, deflected arcuate portions 20c, by virtue of their sharp edges, bite into the interior wall of the housing 2 in numerous places, as indicated in FIG. 1, so as to secure the substrate 20 in position and establish electrical contact with the housing 2. The deflected portions 20c at this time form an acute angle of about 30° degrees with respect to the interior wall of the housing 2. Once the substrate 20 has been assembled into the cell 1 as described hereinabove, the upper one of the carbon/insulator structures 22 can be readily positioned on top of and in direct physical and electrical contact with the substrate 20 (with the carbon layer 22b facing the substrate 20). It will be apparent from the above discussion, therefore, and by reference to FIG. 1, that the combined effects of the multiple substrates 20 gripping onto the housing 2 in numerous places and the multiple contact members 15b of the anode structures 15 gripping onto the rod 6 in numerous places results in a battery stack 3 which is fixed in position within the housing 2. In a typical construction of the battery stack 3 as described hereinabove, twenty anode structures 15 and carbon collector current electrode/separator assemblies 16 can be assembled into a cell of a height approximately equal to the height of one-half of a standard C-size cell.

The abovedescribed current collector substrate 20 is also disclosed, and claimed, in the aforementioned co-pending application Ser. No. 159,267.

Figure 7:
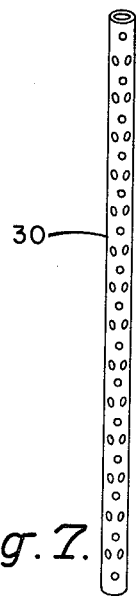
FIG. 7 illustrates a hollow perforated tube as may be utilized in an electrochemical cell in accordance with the invention.

With the abovedescribed battery stack 3 assembled within the cell 1 as discussed hereinabove, the electrolytic solution 5 (e.g., cathodelectrolyte solution) is readily able to diffuse into the stack and permeate the porous components thereof. The flow of the electrolytic solution 5 to the components of the stack is facilitated by the aforedescribed numerous notches 20b formed in the current collector substrates 20 and adjacent to the interior wall of the housing 2 and by the spaces established between the components of the stack and the interior wall of the housing 2 and the rod 6. The flow of electrolytic solution to the battery stack 3 can be further increased, especially in the case of a physically large cell, by the use of a hollow, elongated perforated tube 30 such as shown in FIG. 7 in lieu of a member such as the solid rod 6, in which case the electrolytic solution is able to further penetrate the battery stack 3 by way of the perforations in the tube 30. Irrespective of the particular manner in which the electrolytic solution 5 reaches the battery stack, the electrolytic solution 5 diffuses into the multiple carbon discs 22b by way of the network of electrolyte-conducting channels formed therein and also diffuses into the multiple porous discs 22a. The physical and electrical connection of the multiple anode structures 15 to the rod 6 (or tube 30) establishes that member and the metal strip 8 and the terminal 10 connected therewith as the negative terminal of the cell 1. The physical and electrical connection of the multiple substrates 20 to the interior wall of the housing 2 establishes the housing 2 as the positive terminal of the cell 1.

The provision in the cell of multiple anode structures 15 as described above makes a large surface area of lithium available per unit volume for electrochemical reaction in the cell during discharge of the cell. As this electrochemical action takes place, the lithium is progressively depleted (from the outside to the inside of the cell) and, at the expiration of the rated life span of the cell, is essentially completely depleted. This action is greatly aided by the small gradient in current density from the outside of the lithium discs to the center. The IR losses are thus very low and the degree of material utilization of the lithium is uniform and very substantial. During the discharge of the cell 1, the multiple substrates 20 electrically contact the interior portions of the associated carbon discs 22b thereby to function collectively as a current collector for the cell 1. By virtue of the short and direct physical and current path lengths of the substrates 20 to the housing 2, heat normally developed during the discharge of the cell 1 is rapidly dissipated through the substrates 20 by thermal conduction to the housing 2. The housing 2 thus acts as a heat sink. The above characteristics and features of the cell 1 thereby renders such cell especially useful in high-rate, low-temperature applications.

While there has been described what is considered to be a preferred embodiment of the invention, it will be apparent to those skilled in the art that various changes and modifications may be made therein without departing from the invention as called for in the appended claims.

What is claimed is:

1. An electrochemical cell comprising:
an elongated metal housing having an interior wall;
an elongated metal terminal within and along the direction of the housing; and
an electrochemical system contained within the housing and including an electrolytic solution and a plurality of battery stack components exposed to the electrolytic solution and arranged in a stacked array encircling the elongated metal terminal, said array of battery stack components comprising:
a plurality of metal electrode structures in direct physical contact with the elongated metal terminal and spaced from the interior wall of the housing; and
a plurality of carbon electrode/insulator structures arranged in the array in alternation with the metal electrode structures and each comprising:
a metal substrate spaced from the elongated metal terminal and in direct physical contact with the interior wall of the housing;
first and second porous carbon layers on opposite sides of, and in direct physical contact with, the metal substrate and spaced from the elongated metal terminal, each of said porous carbon layers having a network of electrolyte-conducting channels therethrough for the receipt of, and to be permeated by, the electrolytic solution within the housing; and
first and second porous insulators in direct physical contact with the first and second carbon layers, respectively, and in direct physical contact with adjacent ones of the metal electrode structures and separating the carbon layers from the adjacent metal electrode structures.

2. An electrochemical cell in accordance with claim 1 wherein:
each of the battery stack components has an opening therein through which the elongated metal terminal extends thereby to be encircled by the battery stack;
the openings through the metal substrates and the porous carbon layers being of a size so as to establish spaces between the metal substrates and the porous carbon layers and the elongated metal terminal.

3. An electrochemical cell in accordance with claim 1 wherein:
the metal electrode structures are anode structures each including:
a metal disc having an opening therein through which the elongated metal terminal extends thereby to be encircled by the metal disc; and
attachment means having an opening therein through which the elongated metal terminal extends and including means securing the metal disc to the elongated metal terminal.

4. An electrochemical cell in accordance with claim 3 wherein:
the metal disc of each anode structure is of an oxidizable alkali metal.

5. An electrochemical cell in accordance with claim 4 wherein:
the metal disc of each anode structure is a self-supporting lithium disc.

6. An electrochemical cell in accordance with claim 5 wherein:
the lithium metal disc of each anode structure is a flat disc having a thickness in a range of approximately 0.005 to 0.006 inch.

7. An electrochemical cell in accordance with claim 5 wherein:
the attachment means of each anode structure comprises portions having tines physically attached to the associated lithium metal disc and adjacent to the opening therein, and portions defining an opening therein adjacent to the opening in the disc and including edges in direct physical and electrical contact with and gripping onto the elongated metal terminal.

8. An electrochemical cell in accordance with claim 1 wherein:
each of the metal substrates of each of the carbon/insulator structures has an opening therein through which the elongated metal terminal extends, thereby to be encircled by the metal substrate, and peripheral portions having edges in direct physical and electrical contact with and gripping onto the interior wall of the housing.

9. An electrochemical cell in accordance with claim 8 wherein:
the peripheral portions of each metal substrate are at acute angles with respect to the interior wall of the housing.

10. An electrochemical cell in accordance with claim 9 wherein:
each metal substrate has a thickness of approximately 0.003 inch.

11. An electrochemical cell in accordance with claim 1 wherein:
the metal substrates of the plurality of carbon electrode/insulator structures include means defining passageways adjacent to the interior wall of the housing for the passage of electrolytic solution into the space between the stacked array and the interior wall of the housing.

12. An electrochemical cell in accordance with claim 1 wherein:
each of the metal substrates has an opening therein through which the elongated metal terminal extends, thereby to be encircled by the metal substrate, and a plurality of peripheral openings adjacent to the interior wall of the housing, said openings collectively permitting the passage therethrough of electrolytic solution to the spaces between the stacked array and the elongated metal terminal and the interior wall of the housing, said substrate further including a plurality of peripheral portions having edges in direct physical contact with and gripping onto the interior wall of the housing.

13. An electrochemical cell in accordance with claim 12 wherein:
the peripheral openings of the metal substrates are in the form of notches at the peripheral edges of the substrates and the peripheral portions are at acute angles with respect to the interior wall of the housing.

14. An electrochemical cell in accordance with claim 13 wherein:
the notches of each metal substrate are equally spaced around the periphery of the substrate.

15. An electrochemical cell in accordance with claim 1 wherein:

the first and second porous carbon layers and the first and second porous insulators have openings therein through which the elongated metal terminal extends, thereby to be encircled by the porous carbon layers and the porous insulators;

the first porous carbon layer and the first porous insulator are physically and permanently integrated with each other; and the second porous carbon layer and the second porous insulator are physically and permanently integrated with each other.

16. An electrochemical cell in accordance with claim 15 wherein:

the first and second insulators are of fiberglass.

17. An electrochemical cell in accordance with claim 16 wherein:

each of the first and second carbon layers has a thickness of about 0.007 inch; and each of the first and second porous insulators has a thickness of about 0.005 inch.

18. An electrochemical cell in accordance with claim 1 wherein:

each of the battery stack components has an opening therein through which the elongated metal terminal extends thereby to be encircled by the battery stack, the openings through the metal substrates and the porous carbon layers being of a size so as to establish spaces between the metal substrates and the porous carbon layers and the elongated metal terminal;

each of the metal structures is an anode structure including a metal disc secured to the elongated metal terminal;

the metal substrates include means defining passageways adjacent to the interior wall of the housing for the passage of electrolytic solution into the space between the stacked array and the interior wall of the housing; and the first and second porous carbon layers each comprise an aggregation of porous carbon globules and are physically and permanently integrated with the first and second porous insulators, respectively.

19. An electrochemical cell in accordance with claim 18 wherein:

the metal disc of each anode structure is of an oxidizable alkali metal; and the electrolytic solution is a cathodelectrolyte solution including a reducible soluble cathode and an electrolyte solute dissolved in the reducible soluble cathode.

20. An electrochemical cell in accordance with claim 19 wherein:

the oxidizable alkali metal of each disc of each anode structure is lithium;

the reducible soluble cathode of the cathodelectrolyte solution is thionyl chloride; and the electrolyte solute of the cathodelectrolyte solution is lithium tetrachloroaluminate.

21. A primary electrochemical cell comprising:

an elongated cylindrical metal housing having an interior wall;

an elongated metal terminal positioned generally centrally within the housing and along the direction of the housing;

an electrochemical system contained within the housing and including a cathodelectrolyte solution and a plurality of battery stack components exposed to the cathodelectrolyte solution, said cathodelectrolyte solution including a reducible soluble cathode and an electrolyte solute dissolved in the reducible soluble cathode, and each of the battery stack components has an opening therein through which the elongated metal terminal extends thereby to be encircled by the battery stack, said array of battery stack components comprising:

a plurality of circular, flat, metal anode discs of an oxidizable alkali metal secured to the elongated metal terminal and each having a size so as to establish a space between the anode disc and the interior wall of the metal housing; and a plurality of carbon current collector cathode/insulator structures arranged in the array in alternation with the metal anode discs and each comprising:

a generally circular metal current collector spaced from the elongated metal terminal by way of the opening therein and having a size and shape so as to generally conform to the interior configuration of the housing and make direct physical and electrical contact with the interior wall of the housing;

first and second circular, flat porous carbon layers on opposite sides of, and in direct physical and electrical contact with, the metal current collector and spaced from the elongated terminal by way of the openings therein, each of said porous carbon layers having a network of electrolyte-conducting channels therethrough for the receipt of, and to be permeated by, the cathodelectrolyte solution in the housing; and first and second circular, flat porous insulators in direct physical contact with the first and second carbon layers, respectively, and in direct physical contact with adjacent ones of the metal anode discs and separating the porous carbon layers from the adjacent metal anode discs.

22. A primary electrochemical cell in accordance with claim 21 wherein:

the oxidizable alkali metal of the circular metal anode discs is lithium;

the reducible soluble cathode of the cathoelectrolyte solution is thionyl chloride;

the electrolyte solute of the cathoelectrolyte solution is lithium tetrachloroaluminate; and the first and second porous insulators are of fiberglass.

23. A primary electrochemical cell in accordance with claim 22 wherein:

the first porous carbon layer and the first porous fiberglass insulator are physically and permanently integrated with each other; and the second porous carbon layer and the second porous fiberglass insulator are physically and permanently integrated with each other.

24. A primary electrochemical cell in accordance with claim 23 wherein:

each of the circular metal current collectors has a plurality of notches formed at its periphery adjacent to the interior wall of the housing and defining a plurality of arcuate portions, said notches and the opening therein permitting the passage of cathodelectrolyte solution therethrough to the spaces between the stacked array and the elongated metal terminal and the interior wall of the housing, and said arcuate portions being in direct physical contact with, and at acute angles, with the interior wall of the housing.

25. A primary electrochemical cell in accordance with claim 24 wherein:

the elongated metal terminal includes a cylindrical rod; and the openings in the battery stack components are of a circular configuration.

26. A primary electrochemical cell in accordance with claim 24 wherein:

the elongated metal terminal includes a hollow perforated tube having a plurality of openings therein for supplying cathodelectrolyte solution to the battery stack components.

* * * * *